(12) United States Patent
Murasugi

(10) Patent No.: US 6,332,855 B1
(45) Date of Patent: Dec. 25, 2001

(54) CONTROLLER FOR AN AUTOMATIC TRANSMISSION

(75) Inventor: Takashi Murasugi, Fuji (JP)

(73) Assignee: Jatco Transtechnology Ltd., Fuji (JP)

( * ) Notice: Subject to any disclaimer, the term of this patent is extended or adjusted under 35 U.S.C. 154(b) by 0 days.

(21) Appl. No.: 09/560,343

(22) Filed: Apr. 28, 2000

(30) Foreign Application Priority Data

Apr. 30, 1999 (JP) .................................................. 11-124978

(51) Int. Cl.⁷ .......................... F16H 31/00; E03B 00/00; F16D 19/00
(52) U.S. Cl. .................. 475/116; 137/625.64; 192/87.18
(58) Field of Search ..................................... 475/116, 129; 192/87.13, 87.18, 85 R; 137/625.64

(56) References Cited

U.S. PATENT DOCUMENTS

| | | | |
|---|---|---|---|
| 4,657,041 | * 4/1987 | Mitsui ................................. | 192/85 R |
| 5,291,745 | * 3/1994 | Hanson ................................ | 62/89 |
| 5,562,125 | * 10/1996 | Bray .................................. | 137/625.64 |
| 5,829,560 | * 11/1998 | Mainquist et al. ................... | 192/3.57 |
| 5,902,204 | * 5/1999 | Takagi ............................... | 475/116 X |
| 5,913,577 | * 6/1999 | Arndt ............................. | 137/625.64 X |
| 6,065,487 | * 5/2000 | Watson ........................... | 137/625.64 X |
| 6,167,901 | * 1/2001 | Yoshinura ....................... | 137/625.64 X |
| 6,263,751 | * 7/2001 | Arimoto .......................... | 192/87.18 X |

FOREIGN PATENT DOCUMENTS 8-270779   10/1996   (JP) .

* cited by examiner

Primary Examiner—Sherry Estremsky
Assistant Examiner—Roger Pang
(74) Attorney, Agent, or Firm—Foley & Lardner

(57) ABSTRACT

A sealless accumulator 14, which intervenes between a solenoid valve 4 and a spool valve 5 for absorbing vibrations of a hydraulic oil concerned, is disposed in an upper half of a valve body above an oil path 18 formed in the upper half of the valve body 16. Air discharge path 24 is provided on an opposite side of an accumulator 14 from its oil chamber in which the oil pressure is applied to the piston 22 such that when the oil pressure is applied to the oil path 18, the piston 22 is moved, the hydraulic oil is discharged through the air discharge path 24 to the outside, possible air present up within the oil path 18 flows into the accumulator 14, and then is discharged through the air discharge path 24 to the outside.

4 Claims, 10 Drawing Sheets

CONTROLLER FOR AN AUTOMATIC TRANSMISSION

BACKGROUND OF THE INVENTION

1. Field of the Invention

The present invention relates to controllers for automatic transmissions mounted on vehicles, and more particularly to improvements to such a controller which includes a split-type valve body in which a pressure adjusting valve and an electromagnetic valve are accommodated.

2. Background Art

One such conventional controller for an automatic transmission is disclosed, for example, in a published unexamined Japanese patent application 8-270779. In this controller for an automatic transmission, for example, a select lever and a manually operated valve are used to change an area of a spool valve on which a pressure of the hydraulic oil acts so as to correspond to an N- or P-range indicative of a non-travelling state or a D- or R-range indicative of a travelling state. Thus, for example in the non-travelling state, a load on the pump is reduced. A pressure control valve which controls the pressure of the hydraulic oil acting on frictionally engageable elements of the automatic transmission is composed of a pressure adjusting valve which adjusts an opening in the valve depending on a quantity of movement of its spool to change the pressure of the hydraulic oil, and an electromagnetic valve which outputs a pilot (output) pressure to the pressure adjusting valve such that the electromagnetic valve is generally duty-cycle controlled to adjust the fed hydraulic oil pressure. Both the valves are generally provided within a valve body provided in a lower portion of the automatic transmission.

Since a general valve body is required to contain a spool and other elements, it is often divided into an upper and a lower body half. In order to ensure the freedom of layout of elements of the valve, an accumulator which absorbs vibrations of the hydraulic oil pressure is provided between the spool valve and the electromagnetic valve with the electromagnetic valve, spool valve and accumulator being provided in the lower body half. In this case, it is found that when a hydraulic oil path is provided between the electromagnetic valve and the spool valve so as to extend through the upper half of the valve body to connect the two valves provided in the lower half of the valve body, the vibrations of the oil pressure are amplified and that response to the gear shift control is deteriorated.

The present invention has been made in view of those problems. It is therefore an object of the present invention to provide a controller for an automatic transmission capable of ensuring the freedom of layout of components thereof and avoiding amplification of vibrations of the oil pressure and a reduction in the response to the gear shift control.

SUMMARY OF THE INVENTION

In order to achieve the above object, the present invention provides a controller for an automatic transmission comprising: frictionally engagable elements to be engaged/ disengaged depending on a pressure of a hydraulic oil applied to the frictionally engagable elements; a pressure adjusting valve for adjusting the pressure of the hydraulic oil to be applied to the frictionally engagable elements; an electromagnetic valve for providing an output pressure to control the pressure adjusting valve; and a control valve which accommodates the pressure adjusting valve and the electromagnetic valve, the control valve having at least an upper valve body half and a lower valve body half. An a hydraulic oil path extending between the pressure adjusting valve and the electromagnetic valve is formed between the upper and lower valve body halves in a zigzagging manner. An accumulator fluid communicating with the oil path is disposed on one of the upper and lower valve body halves and, an oil chamber of the accumulator which applies the oil pressure to a piston of the accumulator is communicated with a top of the oil path formed in the one of the valve body halves. And an air discharge path which functions as a discharge path of hydraulic oil is provided on an opposite side of the accumulator from the oil chamber such that when the oil pressure is applied to the oil path, possible air staying up within the oil path is discharged through the air discharge path to the outside.

The piston of the accumulator may be placed in direct contact with the cylinder of the accumulator provided in the one of the upper and lower valve body halves without an intervening sealing member.

In order achieve the above object, the present invention also provides a controller for an automatic transmission comprising: frictionally engagable elements to be engaged/ disengaged depending on a pressure of a hydraulic oil applied to the frictionally engagable elements; a pressure adjusting valve for adjusting the pressure of the hydraulic oil to be applied to the frictionally engagable elements; an electromagnetic valve for providing an output pressure to control the pressure adjusting valve; and a control valve which accommodates the pressure adjusting valve and the electromagnetic valve, the control valve having at least an upper valve body half and a lower valve body half. An a hydraulic oil path extending between the pressure adjusting valve and the electromagnetic valve is formed between the upper and lower valve body halves in a zigzagging manner. The pressure adjusting valve is disposed in one of the upper and lower valve body halves. A part of the pressure adjusting valve is fluid communicated with a top of the oil path formed in the one of the valve body halves. And an air discharge path, which functions as a discharge path of hydraulic oil is provided on an opposite side of a spool of the pressure adjusting valve from its side to which the oil pressure is applied such that when the oil pressure is applied to the oil path, possible air staying up within the oil path is discharged through the air discharge path to the outside.

The controller may comprise a plug provided on an opposite side of the spool of the pressure adjusting valve from its side to which the oil pressure is applied, and a pin provided within the air discharge path so as to fix the plug.

DESCRIPTION OF THE PREFERRED EMBODIMENTS

Preferred embodiments of a controller for an automatic transmission according to the present invention will be described with reference to the accompanying drawings.

Figure 1:
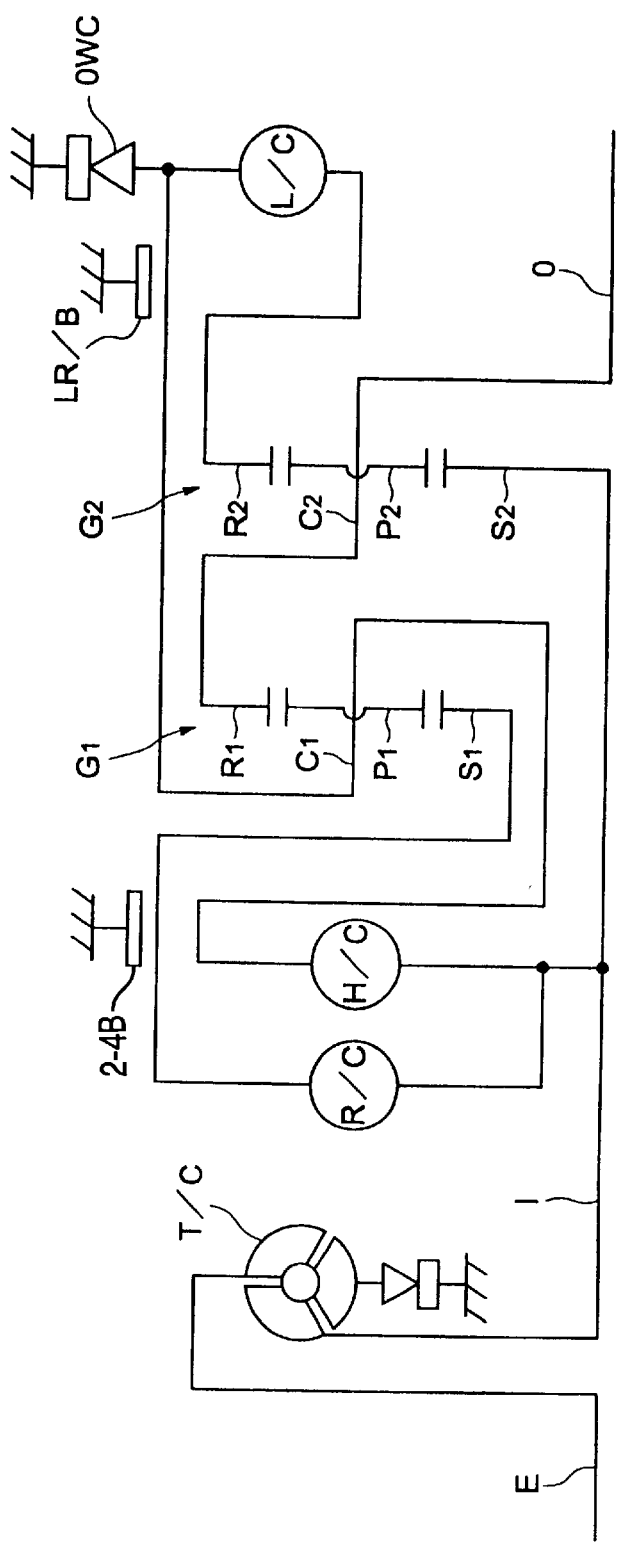
FIG. 1 shows one example of an automatic transmission in a skeleton form.

FIG. 1 shows an automatic transmission of one embodiment of the present invention in a skeleton form. The basic gear-shift structure of the automatic transmission includes two conventional planetary gear mechanisms which each include a sun gear, a pinion and a ring gear, one of which is locked or unlocked to change the ratio of input/output r.p.m. or a reduction ratio. The structure of the automatic transmission is well known, and names and symbols of its main structural elements only will be described herein. Reference symbol $G_1$ denotes the input-side planetary gear mechanism; $S_1$ a sun gear; $P_1$ a pinion; $R_1$ a ring gear; and $C_1$ a carrier. Reference symbol $G_2$ denotes the output-side planetary gear mechanism; $S_2$ a sun gear; $P_2$ a pinion; $R_2$ a ring gear; and $C_2$ a carrier. A reference symbol E denotes an output shaft of an engine connected to a pump impeller of a torque converter T/C; I an input shaft of the engine connected to a turbine liner of the torque converter T/C; and O an output shaft connected to drive wheels.

A high clutch H/C is provided between the carrier $C_1$ of the input-side planetary gear mechanism $G_1$ and the input shaft I. A one-way clutch OWC is provided between the carrier $C_1$ and the case. A low and reverse brake LR/B is provided outside a connection member for the carrier $C_1$ and the one-way clutch OWC. Likewise, a reverse clutch R/C is provided between the carrier $C_1$ of the input-side planetary gear mechanism $G_1$ and the input shaft I with a 2–4 brake 2–4B being provided outside a connection member for the carrier $C_1$ and the input shaft I. The ring gear $R_1$ of the input-side planetary gear mechanism $G_1$, the carrier $C_2$ of the output planetary gear mechanism $G_2$, and the output shaft O are together connected with the sun gear $S_2$ of the output-side planetary gear mechanism $G_2$ being connected with the input shaft I. A low clutch L/C is provided between the ring gear R of the output-side planetary gear mechanism $G_2$ and the one-way clutch OWC. Thus, in this transmission, the reverse clutch R/C and the low and reverse brake LR/B are engaged together and the other frictionally engageable elements are disengaged when the vehicle moves backward. At a first gear speed where the reduction ratio is maximum, the low clutch L/C and the low and reverse brake LR/B are engaged and the other frictionally engageable elements are disengaged. At a second gear speed of a lower reduction ratio, the low clutch L/C and the 2–4 brake 2–4B are engaged and the other frictionally engageable elements are disengaged. At a third gear speed of a still lower less reduction ratio, the low clutch L/C and high clutch H/C are engaged and the other frictionally engageable elements are disengaged. At a fourth gear speed of a much lower reduction ratio, the high clutch H/C and the 2–4 brake 2–4B are engaged and the other frictionally engageable elements are disengaged.

Figure 2:
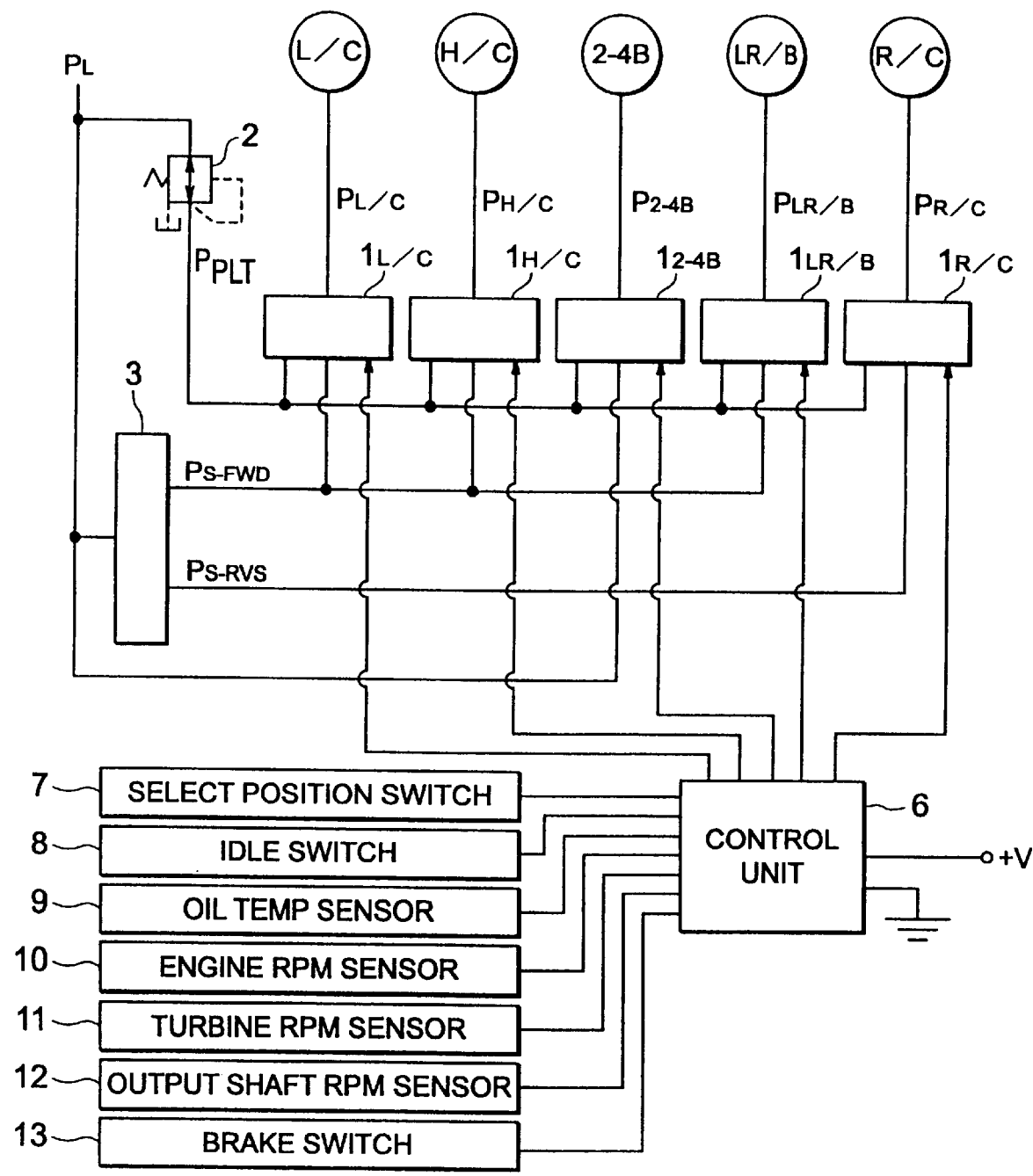
FIG. 2 is a circuit diagram of an actuator of the transmission shown in FIG. 1.

A common valve body is attached to a lower portion of a case of the automatic transmission with an actuator unit being provided which is composed of various valves attached to the valve body. As shown in FIG. 2, the frictionally engageable elements L/C, H/C, 2–4B, LR/B, and R/C are engaged/disengaged by hydraulic oils fed from the various pressure control valves $1_{L/C}$–$1_{R/C}$ provided within the actuator unit. The respective pressure control valves $1_{L/C}$–$1_{R/C}$ receive a pilot pressure $P_{PLT}$ branching through a pilot valve 2 from the original line pressure $P_L$, and spool feed pressures $P_{S\text{-}FWD}$ and $P_{S\text{-}RVS}$ branching from a manual valve 3, and adjust them and output the corresponding pressures to the respective frictionally engageable elements. The respective control valves excluding the reverse clutch pressure control valve $1_{R/C}$ are fed with a forward spool feed pressure $P_{S\text{-}FWD}$ branching from the manual valve 3, and the reverse clutch pressure control valve $1_{R/C}$ is fed with a backward spool feed pressure $P_{S\text{-}RVS}$. The spool feed pressures $S_{S\text{-}FWD}$ and $P_{S\text{-}RVS}$ are equal to the line pressure $P_L$.

Figure 3:
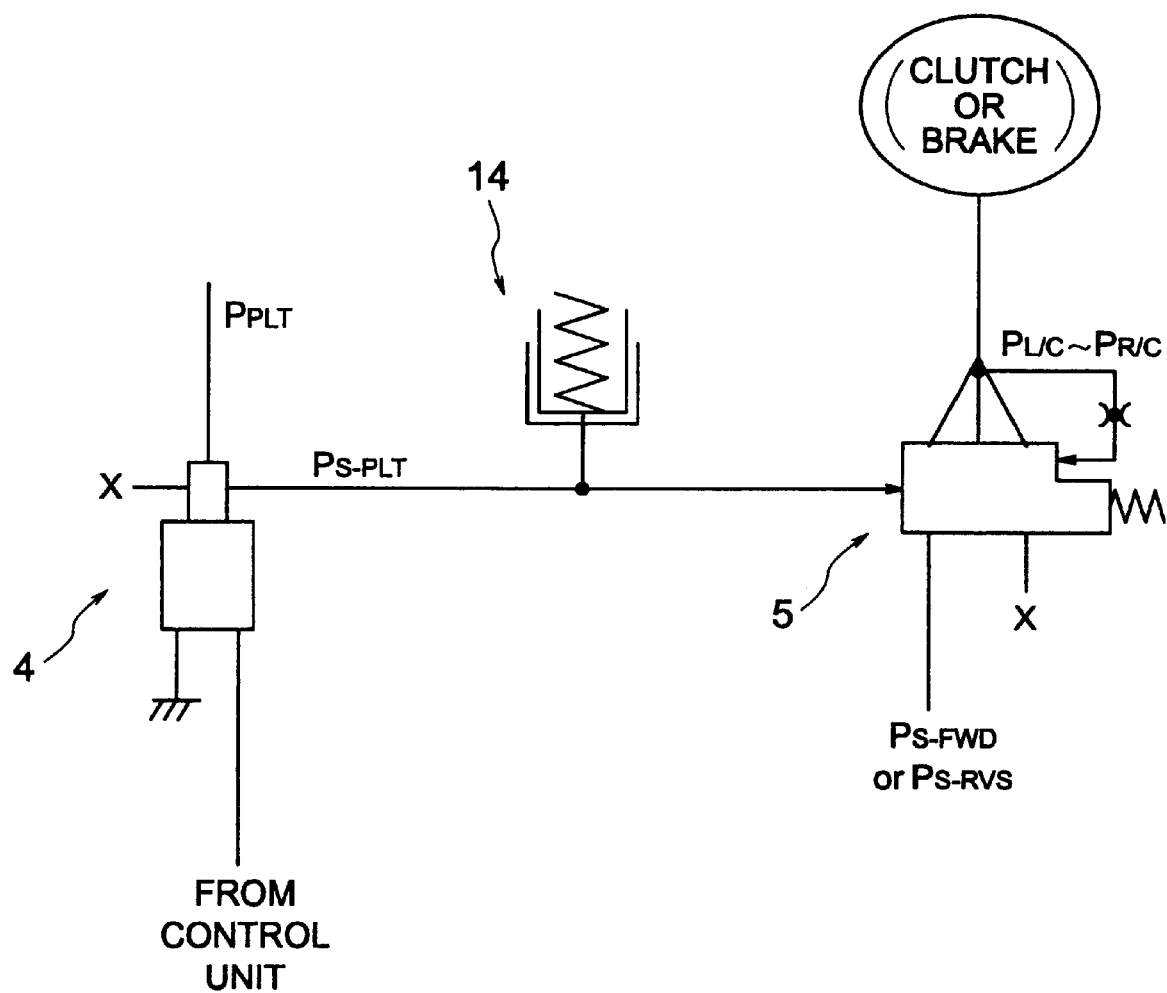
FIG. 3 shows a pressure control valve which controls a gear shift.

Each of the pressure control valves $1_{L/C}$–$1_{R/C}$ substantially has a composition of FIG. 3. More particularly, it includes a solenoid valve (electromagnetic valve) 4 which produces a spool pilot pressure $P_{S\text{-}PLT}$ from the pilot pressure $P_{PLT}$, and a spool valve (pressure adjusting valve) 5 which outputs frictionally engageable element feed pressures $P_{L/C}$–$P_{R/C}$ fed to the frictionally engageable elements from the spool feed pressures $S_{S\text{-}FWD}$ and $P_{S\text{-}RVS}$ in accordance with the spool pilot pressure $P_{S\text{-}PLT}$. In the present embodiment, an accumulator 14 is provided for absorbing vibrations of the oil pressure in a path extending between the solenoid valve 4 and the spool valve 5. As is well known, in the solenoid valve 4, a quantity of movement of the plunger increases as a quantity of a current fed to its coil increases such that, for example, a ball which interrupts fluid communication between the pilot pressure side and the spool pilot pressure side is moved to open the oil path, and that the pilot pressure $P_{PLT}$ fluid communicates with the spool pilot pressure side to increase the spool pilot pressure $P_{S\text{-}PLT}$. The value of the current fed to the coil of the solenoid valve 4 is controlled by a drive signal from an automatic transmission control unit 6 to be described later. In this embodiment, duty cycle control is used which controls a width of a pulse voltage signal fed to the solenoid coil depending on a set duty cycle.

In the spool valve 5, the spool moves to open the oil path as the spool pilot pressure $P_{PLT}$ increases, and the spool feed pressures $P_{S\text{-}FWD}$ and $P_{S\text{-}RVS}$ increase pressures $P_{L/C}$–$P_{R/C}$ to be fed to the frictionally engageable elements. Thus, in this embodiment when the duty cycles for the solenoid valves 4 of the pressure control valves $1_{L/C}$–$1_{R/C}$ are high, the spool pilot pressure $P_{S\text{-}PLT}$ and the frictionally engageable element feed pressures $P_{L/C}$–$P_{R/C}$ increase linearly. As will be described in more detail, no intervening seals are provided around the piston in the accumulator 14 in order to reduce the sliding resistance. Since the accumulator 14 only serves to absorb the vibrations of the oil pressure, its capacity is small compared to an accumulator which creates a so-called shelf pressure.

A throttle valve (not shown) is provided within an engine inlet pipe and opened/closed depending on a step-out quantity of an accelerator pedal by the driver. An idle switch (not shown) is attached to the throttle valve to detect that its opening is zero. An engine r.p.m. sensor 10 which senses the r.p.m. of the engine is attached to the output shaft E of the engine. An oil temperature sensor 9 which senses the temperature of the hydraulic oil contained within a reservoir is provided on the actuator unit. A select position switch 7 is attached to a select bar (not shown) to select one of shift positions of the automatic transmission. The switch 7 detects a selected one of gear positions of the transmission and outputs a corresponding position signal. In more detail, those position signals correspond to actual select positions P, R, N, D, 2 and L of the transmission. A turbine r.p.m. sensor 11 which detects a turbine r.p.m. of the torque converter T/C is attached to the input shaft I of the transmission with an output shaft r.p.m. sensor 12 which senses the output shaft r.p.m. which is substantially equal to the vehicle speed being attached to the output shaft O. A brake switch 13 which is turned on when the brake pedal is stepped out is provided to the brake pedal.

The transmission control unit 6 includes a microcomputer which, for example, performs not shown operations to output control signals to control the transmission and actuator unit, and a drive circuit which converts the control signals output from the microcomputer to drive signals suitable for the actual actuators or the respective solenoids.

A specified structure of the pressure control valve will be explained with reference to FIG. 4 as a first embodiment of the inventive controller for the automatic transmission. In this embodiment, the valve body is divided into an upper half 16 and a lower half 15 joined to each other through a plate-like separator 17. A hydraulic oil path 18 between each solenoid valve 4 and a spool valve 5 is formed between the upper and lower body halves 16 and 15 in a zigzagging manner. In the present embodiment, the solenoid valve 4 and the spool valve 5 are together attached to the lower half 15 of the valve body. The accumulator 14 is attached to the upper half 16 of the valve body. That is, the accumulator 14 is disposed in an upper portion of the valve body and positioned above the oil path 18 extending in a zigzagging manner between the upper and lower halves 16 and 15.

In the accumulator 14, a piston 22 is received within a cylinder 21 with a plug 23 closing the opening end of the cylinder 21. An accumulator oil chamber fluid communicating with the oil path 18 is provided on an opposite side of the cylinder 21 from its plug 23 side end. At least a part of the accumulator oil chamber is positioned further above the oil path 18 formed in the upper half 16 of the valve body. An upward air discharge path 24 is provided in the plug 23 side end of the cylinder 21, i.e., in an opposite end of the cylinder 21 from the accumulator oil chamber through which the oil pressure is applied to the piston 22. The air discharge path 24 has a relatively large diameter through which the hydraulic oil is discharged to the outside, as described later.

Since the accumulator 14 serves to absorb vibrations of the hydraulic oil pressure for the solenoid valve 4, the piston 22 is placed in direct contact with the cylinder 21 to reduce a sliding resistance of the piston 22, and hence any sealing structure is not used. The piston 22 within the accumulator 14 is shown as being pushed leftward by a return spring 25. When the solenoid pilot pressure $P_{S-PLT}$ is applied to the accumulator oil chamber from a port 26, the piston 22 receives an oil pressure at its left end to be moved rightward depending on the intensity of the oil pressure in FIG. 4. Since no sealing structure is provided between the piston 22 and the cylinder 21, the hydraulic oil will leak through a very small ring-like gap formed between the piston and the cylinder 21 toward the right side of the piston 22 or toward the opposite side of the piston from its side to which the oil pressure is applied, and discharged through the air discharge path 24 to the outside. Even when air stays up within the oil path 18, the air will flow to the accumulator oil chamber along the flow of the hydraulic oil due to the applied oil pressure and discharged along with the hydraulic oil through the path 24 to the outside. The path 24 is provided so as to extend upward within the accumulator 14 on the opposite side of the piston 22 from its side to which the oil pressure is applied. Thus, when the oil pressure is applied to the piston 22, the air is discharged effectively through the path 24 to the outside to thereby discharge the air in the oil path 18 completely to the outside.

Amplification of vibrations of the oil pressure and a reduction in the response of the gear-shift control occurring due to the presence of the air within the oil path will be described next.

Figure 5:
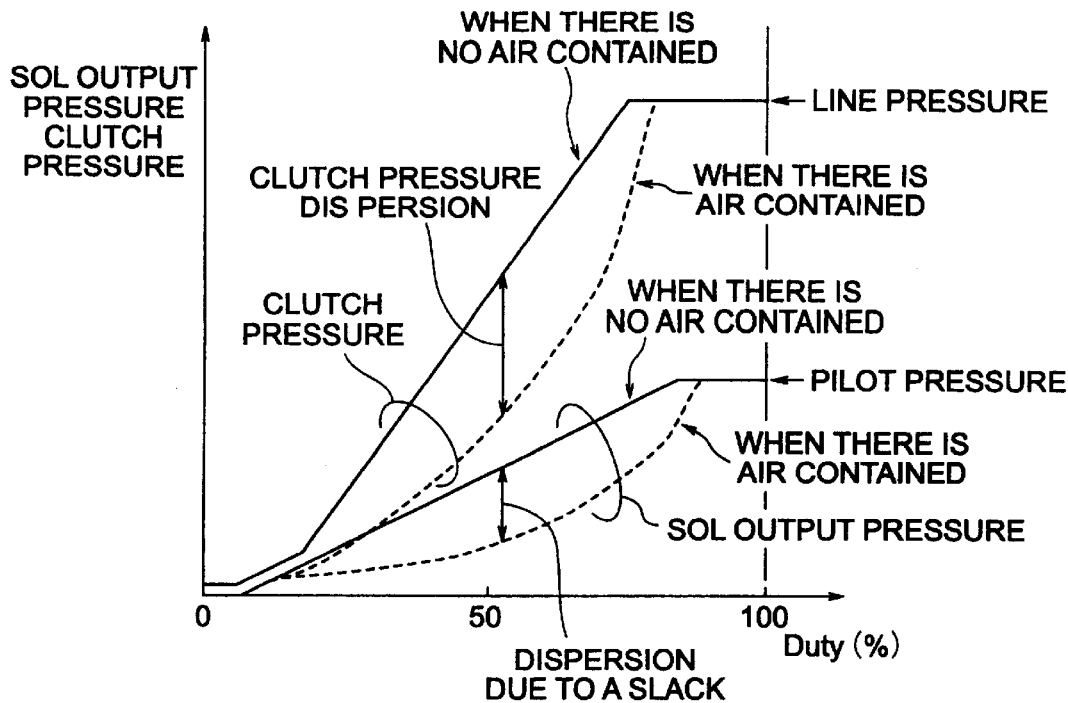
FIG. 5 shows slacks occurring due to air being contained in the oil path.
Figure 6:
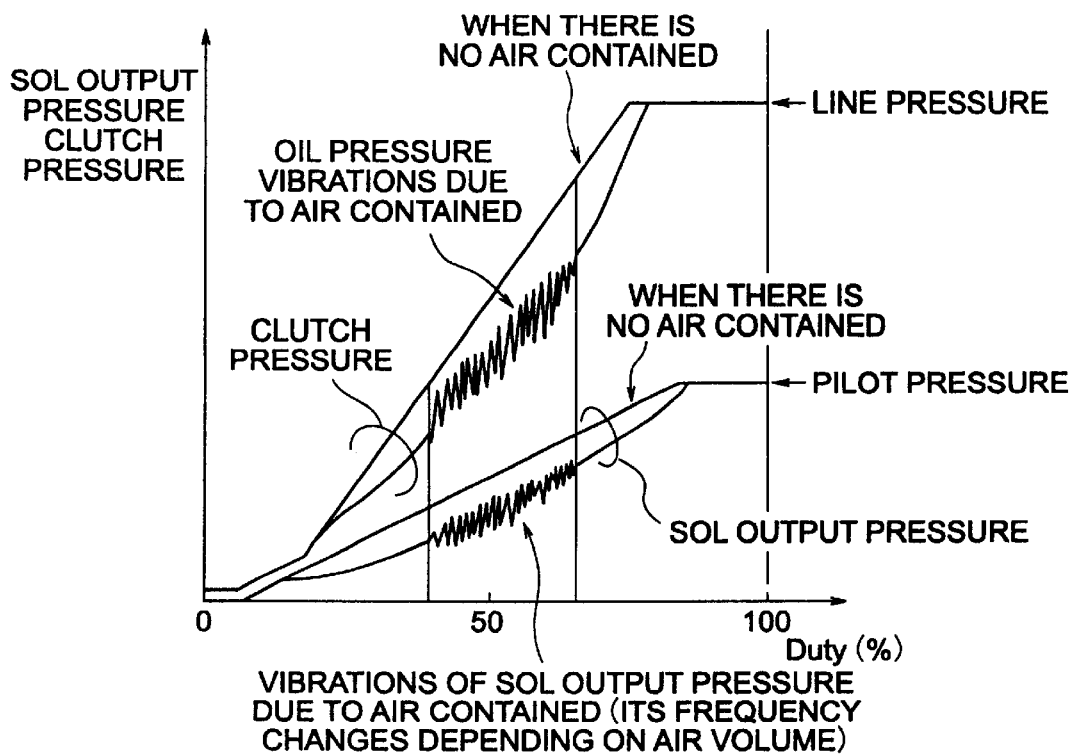
FIG. 6 shows vibrations of the oil pressure occurring due to air being contained in the oil path.

The pressure control valve of FIG. 3 has an oil pressure output characteristic, for example, as shown in FIG. 5 or 6. As the duty cycle for control of the solenoid valve increases, a quantity of a current fed to the coil and hence a quantity of movement of the plunger increase, which gradually increases the output pressure (shown as SOL pressure in FIGS. 5 and 6) from the solenoid valve and hence the output pressure (shown as clutch pressure in FIGS. 5 and 6) applied to the respective frictionally engageable elements gradually increase (when no air is present in FIGS. 5 and 6).

A gas generally changes greatly in volume compared to a liquid depending on a change in the pressure applied thereto. Thus, for example, when air stays within the oil path, the air would greatly change in volume compared to the oil even when one attempts to change the oil pressure, that is, a change in the oil pressure would be delayed compared to a change in the air volume or duty cycle, as shown by broken lines in FIG. 5. For example, in the pressure control valve which is in charge of gear shift control as mentioned above, the response of its gear shift control would decrease as a result, which is also referred to as slack.

The movement of possible air staying within the oil path can cause self-excitation vibrations which could lead to vibrations of the oil pressures as shown in FIG. 6. The frequencies of the vibrations of the line pressure and the pilot pressure shown in FIG. 6 change depending on the volume of the air staying with the oil.

Figure 7:
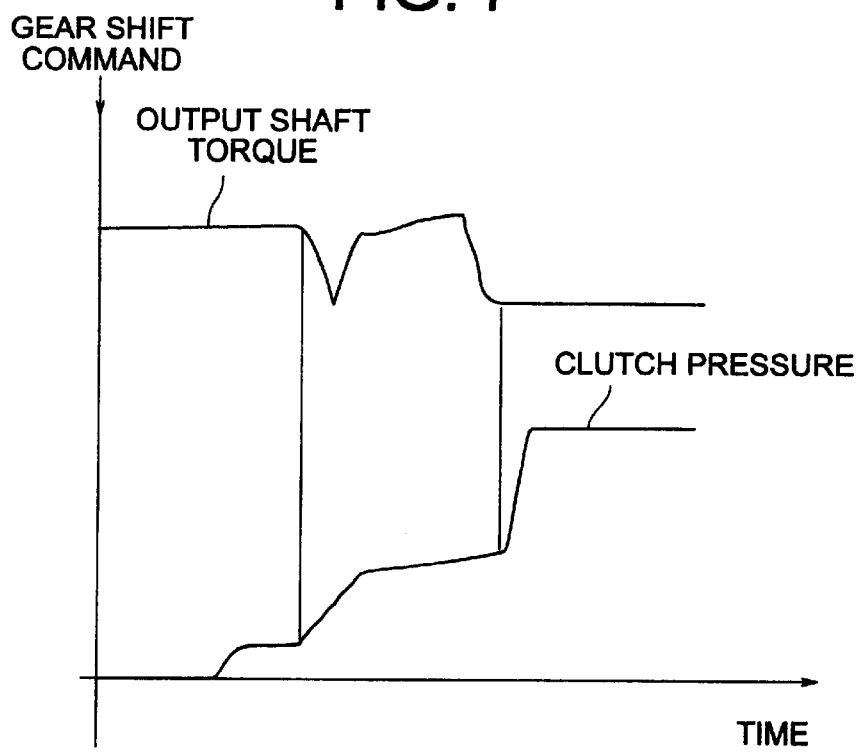
FIG. 7 shows an output shaft torque and the pressure of the hydraulic oil applied to frictionally engageable elements in the gear shift when no air is contained within the oil path.
Figure 8:
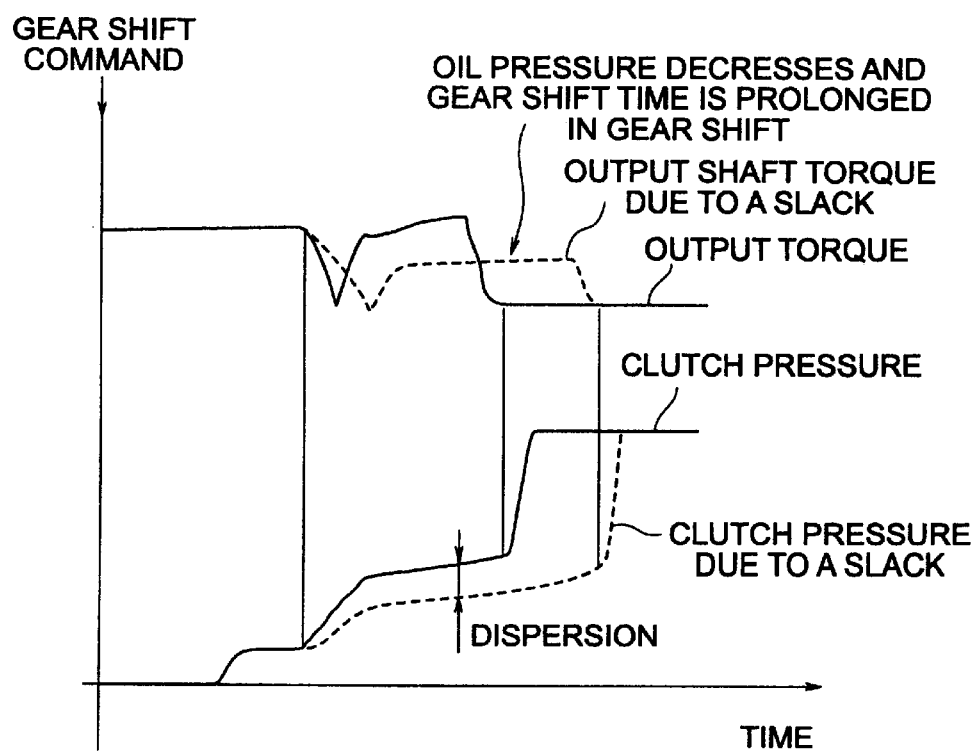
FIG. 8 shows the output shaft torque and the pressure of the hydraulic oil applied to frictionally engageable elements in the gear shift when a slack has occurred due to air being contained in the oil path.

If the output shaft torque and clutch pressure characteristics, for example, in an up-shift made when no air stays within the oil path are as shown in FIG. 7 and there is a slack in the oil pressure change due to the air staying within the oil path, the substantial clutch pressure and the output shaft torque would be delayed in response compared to the case where there is no air staying within the oil path, as shown by broken lines in FIG. 8. Thus air staying within the oil path would the responsibility of the gear-shift control.

Figure 9:
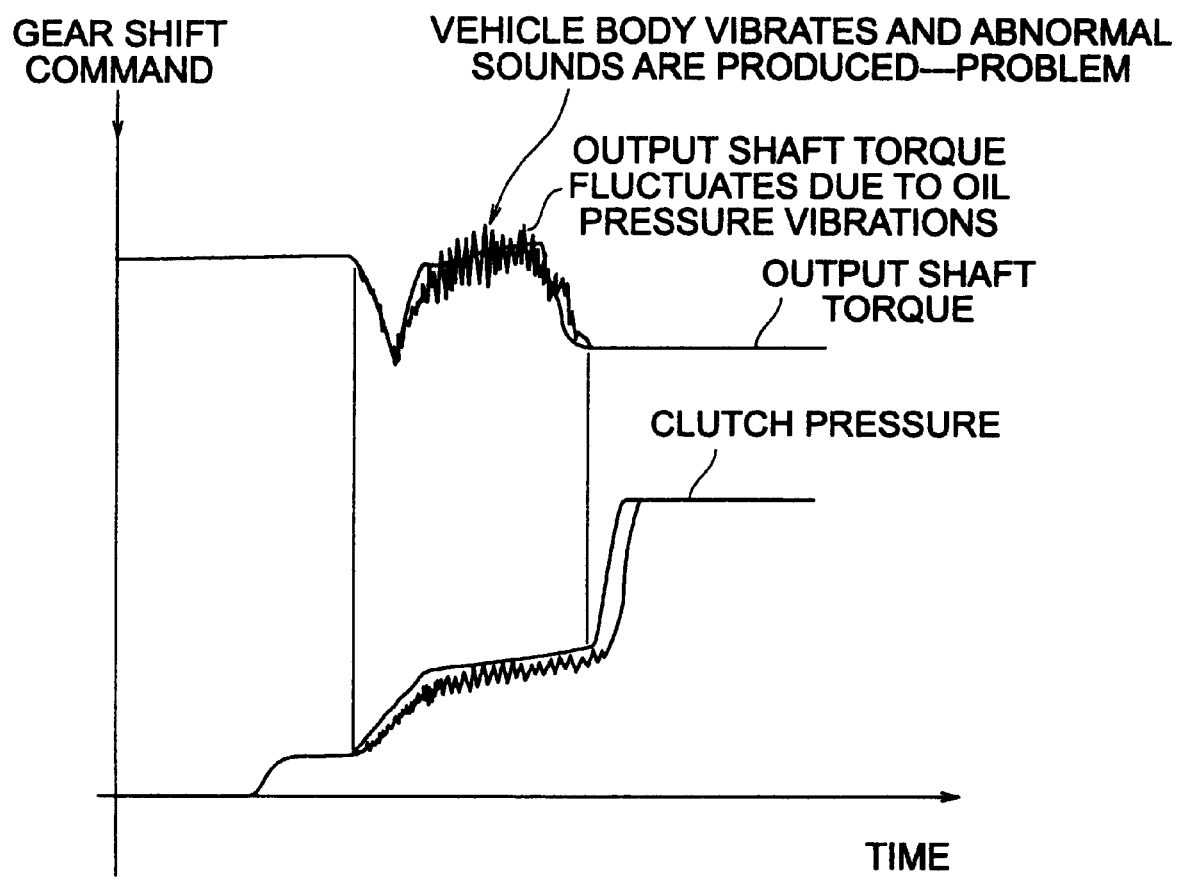
FIG. 9 shows the output shaft torque and the pressure of the hydraulic oil applied to frictionally engageable elements when vibrations of the oil pressure have occurred due to air being contained in the oil path.

If there occur vibrations of the oil pressure due to air staying within the oil path, the substantial clutch pressure and output shaft torque appear as fluctuations of the output shaft torque compared to the case in which no air is contained within the oil path, as shown by broken lines in FIG. 9, which would cause vibrations of the vehicle and generation of abnormal sounds in the gear shift.

Figure 4:
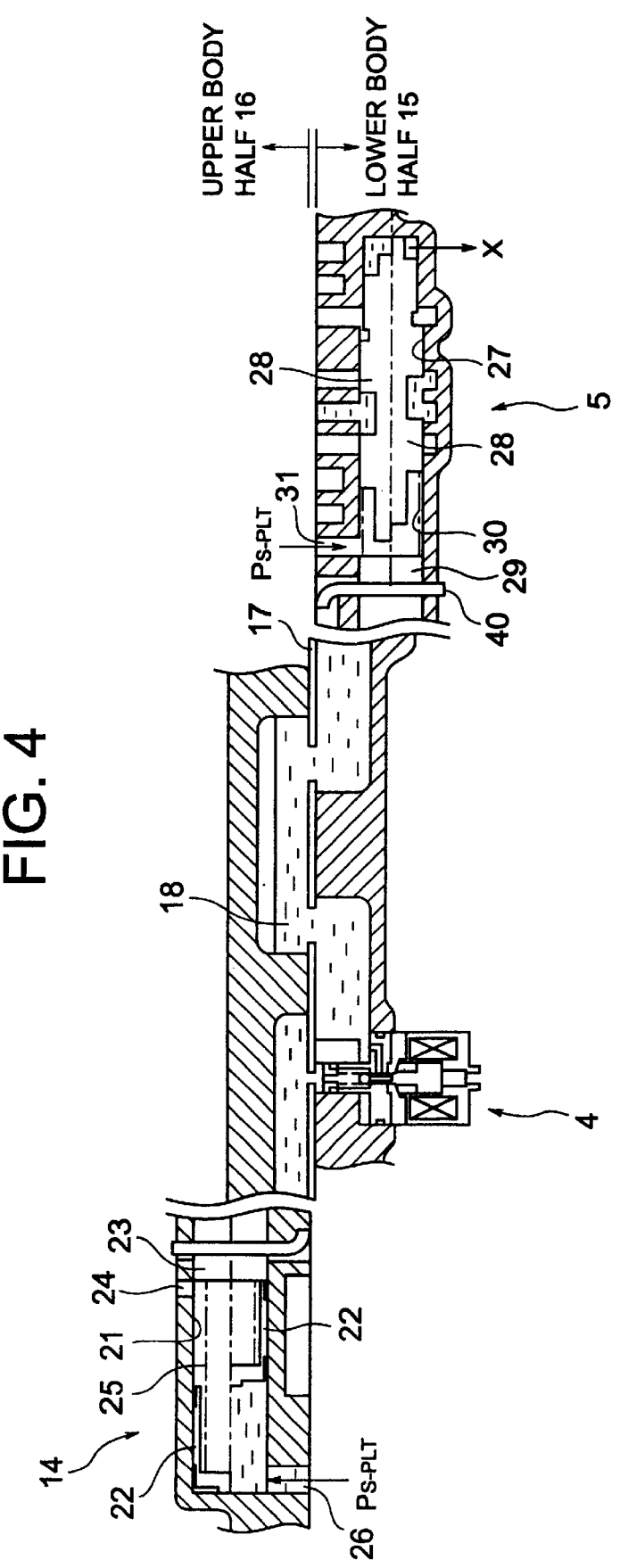
FIG. 4 is a cross-sectional view of a first embodiment of the pressure control valve of FIG. 3.

In contrast, in the pressure control valve of FIG. 4, the sealless accumulator 14 is disposed in the upper half 16 or upper portion of the valve body and the air discharge path 24 is provided in the accumulator body on the opposite side of the cylinder 21 from its side where the oil pressure is applied to the piston 22. When the oil pressure is applied to the piston 22 at its left end, possible air staying up within the oil path 18 is discharged through the air discharge path 24 to the outside. Thus, the freedom of layout of the elements of the pressure control valve is ensured while no air continues to stay within the oil path 18, so that amplification of vibrations of the oil pressure and a decrease in the response of the gear shift control are avoided. Since the air discharge path 24 also functions as a discharge path for the hydraulic oil, the path 24 is relatively large in diameter and not blocked with substances. The time required for forming the path 24 is reduced. The piston 22 within the accumulator 14 has no sealing structure, so that possible air present up within the oil path easily moves through a gap between the piston 22 and the cylinder 21 toward the path 24, which contributes to air evacuation.

Figure 10:
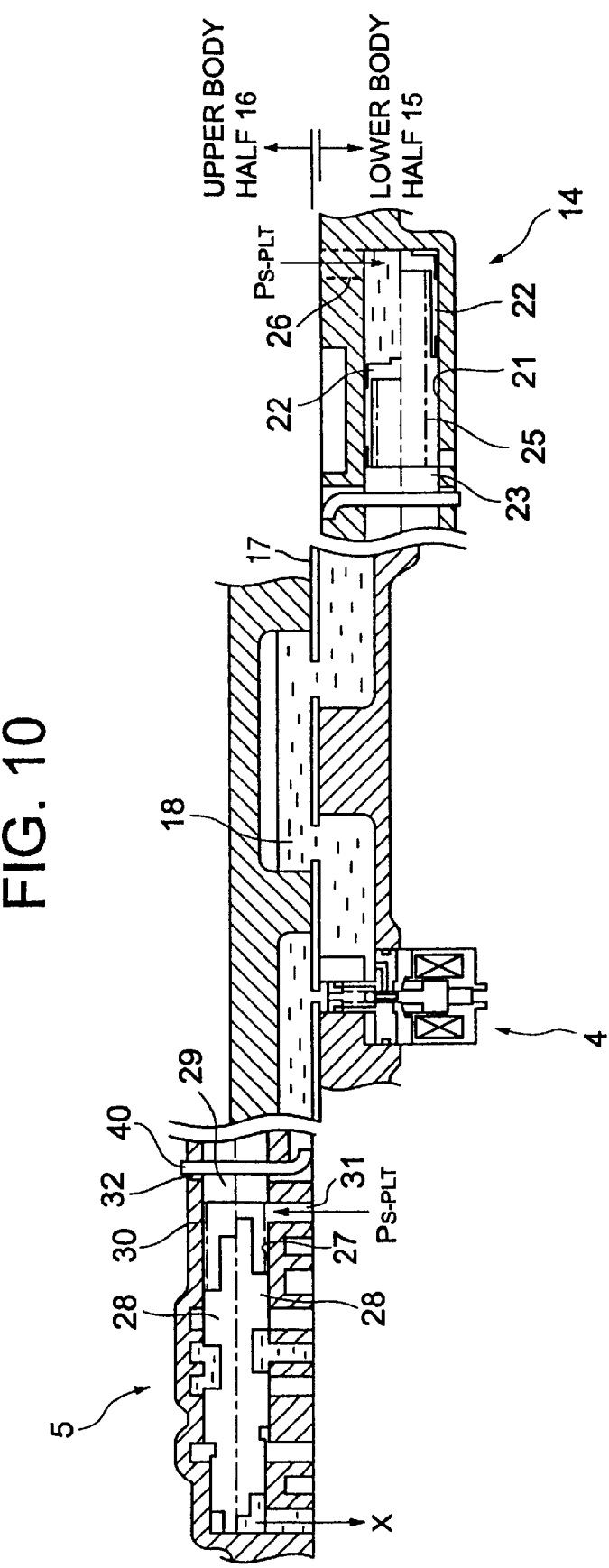
FIG. 10 is a cross-sectional view of a second embodiment of the pressure control valve of FIG. 3.

A second embodiment of the controller for the automatic transmission according to the present invention will be described next. A vehicle involving this embodiment is similar in main structure to that of the first embodiment of FIGS. 1–3. In the present embodiment, a specified structure of the pressure control valve of FIG. 3 is shown in FIG. 10. Also, in this embodiment the valve body is divided into upper and lower halves 16 and 15 joined to each other through a plate-like separator 17. Also, an oil path 18 extending between each solenoid valve 4 and a spool valve 5 is formed between the upper and lower halves 16 and 15 in a zigzagging manner.

In the present embodiment, the solenoid valve 4 and the accumulator 14 are attached in the lower half 15 of the valve body with the spool valve 5 being attached in the upper half 16. That is, the spool valve 5 is disposed in an upper portion of the valve body such that it is positioned above the oil path 18 extending between the solenoid valve 4 and the spool valve 5. The accumulator 14 has no sealing structure between the piston 22 and the cylinder 21 to absorb vibrations of the oil pressure as in the first embodiment.

In the spool valve 5, the spool 28 is received within the cylinder 27. The cylinder 27 is blocked with a plug 29. The spool 28 is arranged to be impressed with the spool pilot pressure $P_{S-PLT}$ input through a rightward port 31. The spool 28 is prevented from slipping off from the cylinder 27 by a pin 40 which extends across the opening end of the cylinder 27 and which is received at an upper end in an air discharge path 32 provided in the accumulator body. An upper end of the port 31 is situated at a position higher than the oil path 18. The spool pilot pressure $PS_{S-PLT}$ introduced through the port 31 into the cylinder 27 causes the hydraulic oil to leak into between the cylinder 27 and the plug 29 and then to discharge through the air discharge path 32. Even if air stays above the hydraulic oil within the oil path 18 when the valves are attached in position, the air flows along with the flow of the hydraulic oil within the cylinder 27 and is discharged along with the hydraulic oil from the path 32, since the air discharge path 32 is provided in the accumulator body on the opposite side of the plug 29 from the port 31 for introducing the hydraulic oil. Thus, when the oil pressure is applied to within the cylinder 27 through the port 31, the air is discharged effectively through the path 32 from the cylinder, and hence the air present within the oil path 18 is also discharged completely through the path 32.

Thus, since the upper end of the port 31 is situated above the oil path 18, air staying over the oil within the path 18 moves along with the hydraulic oil so as to be discharged from the path 32 to the outside. Thus, no air continues to stay within the oil path 18 which extends in zigzagging manner between the lower and upper halves 15 and 16 of the valve body. Therefore, amplification of vibrations of the oil pressure and a decrease in the response of the gear shift control are avoided. Since the oil path 18 is provided so as to extend in a zigzagging manner between the upper and lower halves of the valve body, the freedom of layout, for example, of the elements of the pressure control valve etc. increases. Since the air discharge path 32 functions as a hole in which the pin 40 is fixed and through which a part of the hydraulic oil is discharged to the outside, the air discharge path 32 has a relatively large diameter and is not blocked with substances. Little time is required for forming the hole.

Figure 11:
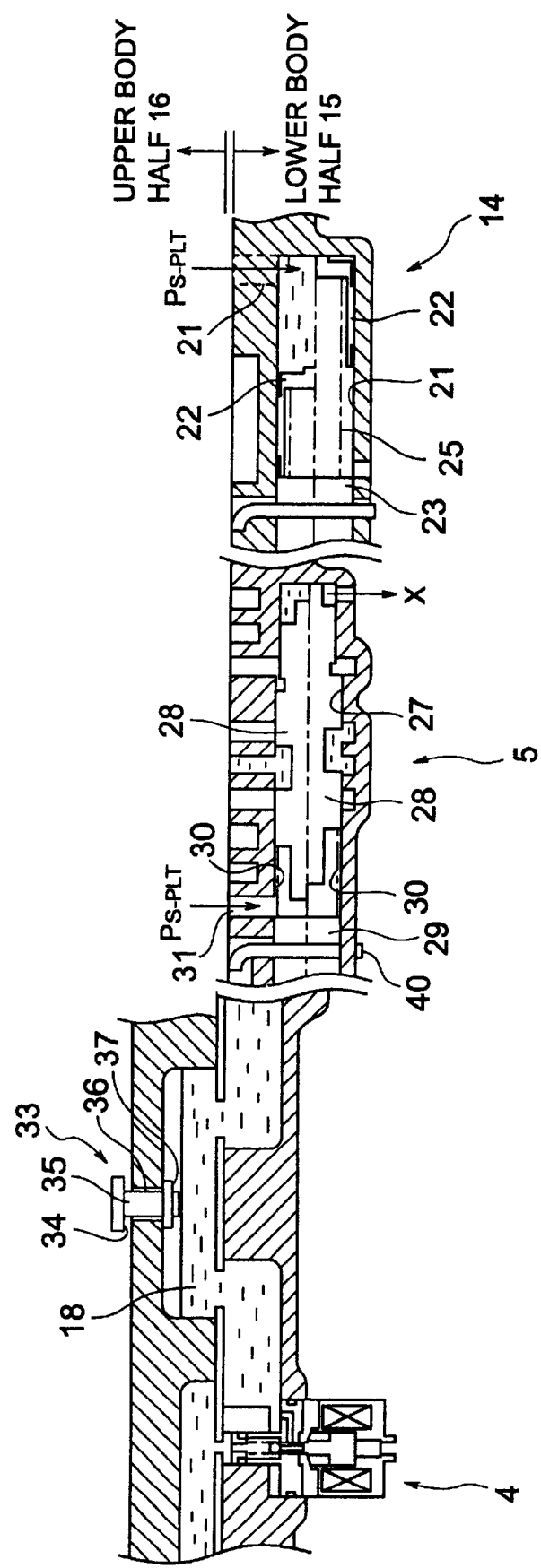
FIG. 11 is a cross-sectional view of a third embodiment of the pressure control valve of FIG. 3.
Figure 12:
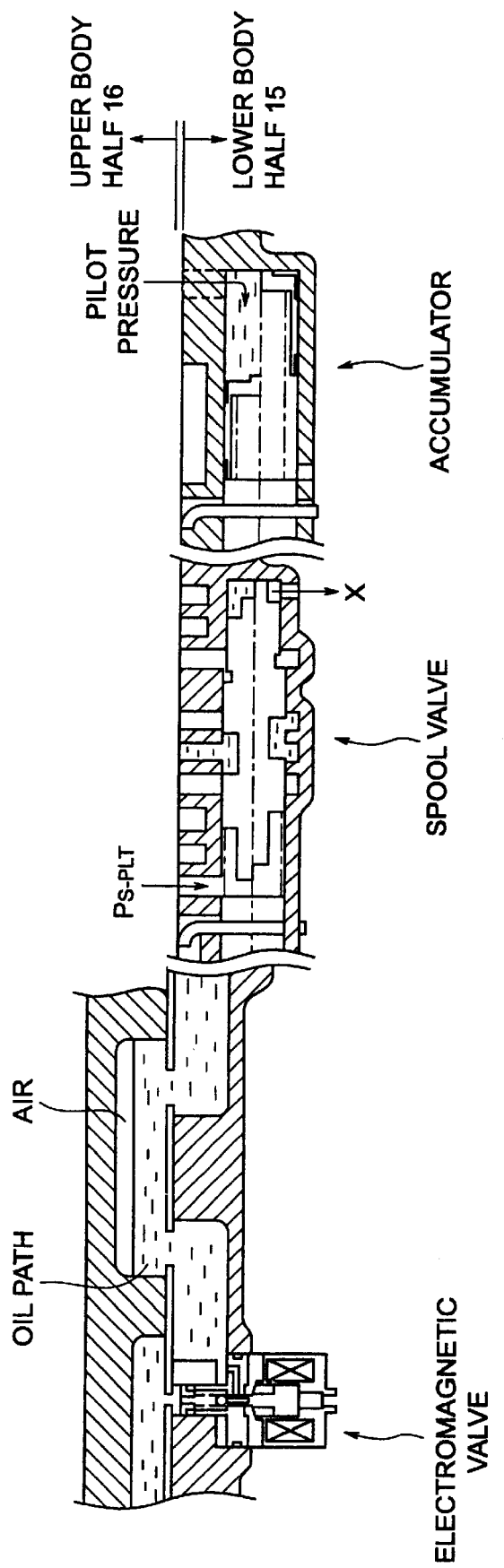
FIG. 12 is a cross-sectional view of one example of a conventional gear-shift control valve.

A third embodiment of the controller for the automatic transmission according to the present invention will be described next. A vehicle involving this embodiment is similar in main structure to that of the first embodiment shown in FIGS. 1–3. In the present embodiment, a specified structure of the pressure control valve of FIG. 3 is shown in FIG. 11. Also, in this embodiment the valve body is divided into upper and lower halves 16 and 15 joined to each other through a plate-like separator 17. Also, an oil path 18 extending between each solenoid valve 4 and a spool valve 5 is formed between the upper and lower halves 16 and 15 in a zigzagging manner.

In the present embodiment, all the solenoid valves 4, accumulators 14 and spool valves 5 are attached in the lower half 15 of the valve body. Among the elements of the pressure control valve, only an intermediate portion of the oil path portion 18 is provided in the upper half 16 of the valve body. As in the first embodiment, the accumulator 14 has no sealing structure between the piston 22 and the cylinder 21 to absorb vibrations of the hydraulic oil.

An upward air discharge path 33 is provided above an oil path 18 which is provided in the upper half 16 of the valve body. The path 33 is formed around a T-like blocking member 35 which is received loosely within a through hole 36 formed in the upper valve body half 16. The through hole 36 fluid communicates with the oil path 18 with a slip-off stop 37 in the form of a circular ring being attached to a lower portion of the T-like member 35 to stop the T-like member from slipping off from the through hole 36. Thus, when no oil pressure is applied to the oil path, the T-like member 35 is placed at a lower position such that its head 34 abuts on the upper half 16 of the valve body to close the through hole 36. When the oil pressure is applied to the oil path, it presses the head 34 of the T-like member head 35 to lift the member to thereby form a ring-like gap around the T-like member 35 within the through hole 36 through which the hydraulic oil is discharged. Possible air staying within the oil path 18 is discharged along with the hydraulic oil through the path 33. In this case, since the path 33 is formed so as to extend upward, the oil pressure applied to the oil path effectively discharges part of the hydraulic oil from the path 33 and hence air present within the oil path 18 is also completely discharged.

Thus, the air staying within the oil path 18 moves and discharges through the path 33, so that the air does not stay within the oil path 18. Thus, an increase in the vibration of the oil pressure and a reduction in the response of the gear shift control are avoided.

As described above, according to the inventive controller for the automatic transmission, the accumulator is disposed on one of the two valve body halves, for example, an upper half, with an oil chamber of the accumulator which applies the oil pressure to a piston of the accumulator fluid communicating with a top of the oil path formed in the one of the valve body halves. An air discharge is provided on an opposite side of the accumulator from the oil chamber such that when the oil pressure is applied to the oil path, possible air staying up within the oil path is discharged through the air discharge path to the outside. Thus, the freedom of layout of the elements of the pressure control valve is ensured while no air continues to stay within the oil path, so that amplification of vibrations of the oil pressure and a decrease in the response of the gear shift control are avoided. Since the air discharge path also functions as a discharge path for the hydraulic oil, the path is relatively large in diameter and not blocked with substances. Little time is required for forming the path.

According to the inventive controller for the automatic controller, there is no sealing structure between the piston and the cylinder of the accumulator. Thus, the air staying up within the oil path is likely to move through a circular gap between the piston and the cylinder toward the air discharge path to thereby discharge the air more efficiently.

According to the inventive controller for the automatic controller, the pressure adjusting valve is disposed in one of the two valve body halves, for example, an upper half, and has a port which fluid communicates with the oil path and a top of the oil path formed in the one of the valve body halves. An air discharge path is provided on an opposite side of a spool of the pressure adjusting valve from its side to which the oil pressure is applied such that when the oil pressure is applied to the oil path, possible air staying up within the oil path is discharged through the air discharge path to the outside. Thus, the freedom of layout of the elements of the pressure control valve is ensured while no air continues to stay within the oil path, so that amplification of vibrations of the oil pressure and a decrease in the response of the gear shift control are avoided.

According to the inventive controller for the automatic controller, since the air discharge path functions as a hole in which the pin is fixed and through which a part of the hydraulic oil is discharged to the outside, the path has a relatively large diameter and is not blocked with substances. Little time is required for forming the path.

What is claimed is:

1. A controller for an automatic transmission comprising:
   frictionally engagable elements to be engaged/disengaged depending on a pressure of a hydraulic oil applied to said frictionally engagable elements;
   a pressure adjusting valve for adjusting the pressure of the hydraulic oil to be applied to said frictionally engagable elements;
   an electromagnetic valve for providing an output pressure to control said pressure adjusting valve;
   a control valve which accommodates said pressure adjusting valve and said electromagnetic valve, said control valve body having at least an upper valve body half and a lower valve body half;
   a hydraulic oil path extending between the pressure adjusting valve and the electromagnetic valve and formed between the upper and lower valve body halves in a zigzagging manner;
   an accumulator fluid communicating with said oil path disposed on one of said the upper and lower valve body halves, an oil chamber of said accumulator which applies the oil pressure to a piston of said accumulator fluid communicating with a top of the oil path formed in said one of the valve body halves; and
   an air discharge path which functions as a discharge path of hydraulic oil provided on an opposite side of said accumulator from the oil chamber such that when the oil pressure is applied to the oil path, possible air staying up within the oil path is discharged through said air discharge path to the outside.

2. The controller according to claim 1, wherein said the piston of said accumulator is placed in direct contact with a cylinder of said accumulator provided in said one of said upper and lower valve body halves without an intervening sealing member.

3. A controller for an automatic transmission comprising:
   frictionally engagable elements to be engaged/disengaged depending on a pressure of a hydraulic oil applied to said frictionally engagable elements;
   a pressure adjusting valve for adjusting the pressure of the hydraulic oil to be applied to said frictionally engagable elements;
   an electromagnetic valve for providing an output pressure to control said pressure adjusting valve;
   a control valve which accommodates said pressure adjusting valve and said electromagnetic valve, said control valve having at least an upper valve body half and a lower valve body half;
   a hydraulic oil path extending between the pressure adjusting valve and the electromagnetic valve and formed between the upper and lower valve body halves in a zigzagging manner;
   said pressure adjusting valve being disposed in one of said the upper and lower valve body halves a port of the pressure adjusting valve, which fluid communicates with said oil path, being communicated with a top of the oil path formed in said one of the valve body halves; and
   an air discharge path which functions as a discharge path of hydraulic oil provided on an opposite side of a spool of said pressure adjusting valve from its side to which the oil pressure is applied such that when the oil pressure is applied to the oil path, possible air staying up within the oil path is discharged through said air discharge path to the outside.

4. The controller according to claim 3, comprising a plug provided on an opposite side of the spool of said pressure adjusting valve from its side to which the oil pressure is applied, and a pin provided within said air discharge path so as to fix the plug.

* * * * *